US012647740B2

(12) United States Patent
Urry et al.

(10) Patent No.: US 12,647,740 B2
(45) Date of Patent: Jun. 2, 2026

(54) HEARING DEVICE AND METHOD FOR ANALYZING BIOFLUID SECRETED BY OUTER EAR TISSUE

(71) Applicant: SONOVA AG, Staefa (CH)

(72) Inventors: Emily Urry, Zollikon (CH); Michael Au, Union City, CA (US)

(73) Assignee: Sonova AG, Staefa (CH)

( * ) Notice: Subject to any disclaimer, the term of this patent is extended or adjusted under 35 U.S.C. 154(b) by 1145 days.

(21) Appl. No.: 17/496,655

(22) Filed: Oct. 7, 2021

(65) Prior Publication Data

US 2023/0110170 A1 Apr. 13, 2023

(51) Int. Cl.
*H04R 25/00* (2006.01)

(52) U.S. Cl.
CPC .................................. *H04R 25/654* (2013.01)

(58) Field of Classification Search
CPC ................ H04R 25/654; H04R 1/1041; H04R 2225/021; G01N 27/333; G01N 27/3271; G01N 27/4145; A61B 5/14517; A61B 5/14532; A61B 5/14546; A61B 5/1486; A61B 5/6801
See application file for complete search history.

(56) References Cited

U.S. PATENT DOCUMENTS

| | | | |
|---|---|---|---|
| 4,768,176 A | 8/1988 | Kehr | |
| 5,721,783 A | 2/1998 | Anderson | |
| 8,077,889 B2 | 12/2011 | Bachler et al. | |
| 8,866,661 B2 | 10/2014 | Knudsen | |
| 9,987,489 B2 | 6/2018 | Goodall et al. | |
| 10,015,601 B2 | 7/2018 | Frederiksen | |
| 10,524,726 B2 | 1/2020 | Wang | |
| 2008/0154098 A1 | 6/2008 | Morris | |
| 2013/0338769 A1* | 12/2013 | Boyden | A61B 5/686 623/8 |
| 2014/0012114 A1* | 1/2014 | Zevenbergen | A61B 5/14517 600/346 |
| 2018/0143155 A1* | 5/2018 | Cardosi | C12Q 1/32 |
| 2020/0086133 A1 | 3/2020 | Wang | |
| 2020/0268315 A1 | 8/2020 | Burwinkel | |

(Continued)

FOREIGN PATENT DOCUMENTS

| | | |
|---|---|---|
| DE | 202009015361 | 3/2011 |
| DE | 102018204695 | 12/2018 |
| WO | 2011110228 | 9/2011 |

OTHER PUBLICATIONS

Aldeer, et al., “A review of medication adherence monitoring technologies”, Appl. Syst. Innov. 2018, 1, 14; doi:10.3390/asi1020014.

(Continued)

*Primary Examiner* — Justin Xu
(74) *Attorney, Agent, or Firm* — ALG Intellectual Property, LLC

(57) ABSTRACT

An exemplary hearing device may comprise a housing configured to be worn at an ear of a user and an absorbing member positioned on the housing and configured to absorb a biofluid secreted by outer ear tissue of the user while the housing is worn by the user. The hearing device may further comprise an electrode assembly positioned with respect to the absorbing member such that the electrode assembly is in fluidic contact with the biofluid when the biofluid is absorbed by the absorbing member.

18 Claims, 12 Drawing Sheets

(56) References Cited

U.S. PATENT DOCUMENTS

| | | | | |
|---|---|---|---|---|
| 2020/0374641 | A1* | 11/2020 | Husung | H04R 25/656 |
| 2022/0244240 | A1* | 8/2022 | Dunlop | G01N 27/3271 |
| 2022/0360913 | A1* | 11/2022 | Stapf | H04R 25/554 |
| 2024/0049994 | A1* | 2/2024 | Yin | A61B 10/0064 |

OTHER PUBLICATIONS

Emaminejad, et al.,"Autonomous sweat extraction and analysis applied to cystic fibrosis and glucose monitoring using a fully integrated wearable platform", Proc. Natl. Acad. Sci. U.S.A. 114, 4625-4630 (2017).

Gao, et al., "Fully integrated wearable sensor arrays for multiplexed in situ perspiration analysis", Nature 529, 509-514 (2016).

Hauke, et al., "Complete validation of a continuous and blood-correlated sweat biosensing device with integrated sweat stimulation", Lab Chip 18, 3750-3759 (2018).

Heikenfeld, et al., "Accessing analytes in biofluids for peripheral biochemical monitoring", Nat. Biotechnol. 37, 407-419 (2019).

Kini, et al.,"Interventions to improve medication adherence: a review", JAMA, 320(23), 2461-2473, 2018.

Lin, et al., "Natural perspiration sampling and in situ electrochemical analysis with hydrogel micropatches for user-identifiable and wireless chemo/biosensing", ACS Sens. 2020, 5, 93-102.

Lin, et al., "Noninvasive wearable electroactive pharmaceutical monitoring for personalized therapeutics", Proceedings of the National Academy of Sciences, 117(32), 19017-19025, 2020, www.pnas.org/cgi/doi/10.1073/pnas.2009979117.

Michaels, et al., "Ear, Nose, and Throat Histopathology", Springer-Verlag London Limited 2001, p. 10.

Narayanamurthy, et al.,"Advances in passively driven microfluidics and lab-on-chip devices: a comprehensive literature review and patent analysis", RSC Adv., 2020, 10, 11652, DOI: 10.1039/dora00263a.

Tai, et al., "Methylxanthine drug monitoring with wearable sweat sensors", Adv. Mater. 30, e1707442 (2018).

Teymourian, et al., "Wearable Electrochemical Sensors for the Monitoring and Screening of Drugs", ACS sensors, 2020, 5(9), 2679-2700.

Ulley, et al., "Deprescribing interventions and their impact on medication adherence in community-dwelling older adults with polypharmacy: a systematic review", BMC geriatrics, 19(1), 15, 2019.

World Health Organization, et al., "Adherence to Long Term Therapies. Geneva: Evidence for Action", 2003, https://apps.who.int/iris/handle/10665/42682.

Yang, et al., "Wearable and flexible electronics for continuous molecular monitoring", Chem. Soc. Rev. 48, 1465-1491 (2019).

Zhao, et al., "A wearable freestanding electrochemical sensing system", Sci. Adv. 6, eaaz0007 (2020).

* cited by examiner

HEARING DEVICE AND METHOD FOR ANALYZING BIOFLUID SECRETED BY OUTER EAR TISSUE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location). Hearing devices may use an in-the-ear ("ITE") component to facilitate providing the processed input sound signal to the user. Such ITE components are configured to fit at least partially within an ear canal of the user.

In addition to being used to facilitate providing the processed input sound signal to the user, such ITE components may also include electrodes that may be configured to contact tissue within the ear canal of the user while the ITE component is worn by the user. Such electrodes may be used, for example, to determine biological attributes associated with the user. However, such electrodes provided within the ear canal are easily clogged with cerumen and/or subject to biofouling resulting in unreliable data. Accordingly, there remains room for improvement in the configuration and/or functionality of electrodes used to determine biological attributes of a user of a hearing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Hearing devices and methods for analyzing biofluid secreted by outer ear tissue are described herein. As will be described in more detail below, an exemplary hearing device may comprise a housing configured to be worn at an ear of a user, an absorbing member positioned on the housing and configured to absorb a biofluid secreted by outer ear tissue of the user while the housing is worn by the user, and an electrode assembly positioned with respect to the absorbing member such that the electrode assembly is in fluidic contact with the biofluid when the biofluid is absorbed by the absorbing member. In certain examples, hearing devices such as those described herein may include a processor configured to apply, by way of the electrode assembly, an electric potential on the biofluid absorbed by the absorbing member of the hearing device, measure a current that flows through the biofluid based on the electric potential, and determine, based on the measured current, a property of the biofluid.

By providing hearing devices such as those described herein, it may be possible to provide a sensor interface having an optimized configuration for interacting with biofluid (e.g., sweat) secreted by outer ear tissue of a user. In addition, because hearing devices such as those described herein are positioned to interact with biofluid secreted from outer ear tissue, it is possible to obtain more meaningful and reliable data as compared to conventional hearing devices with electrodes positioned in the ear canal that are subject to debris (e.g., cerumen) and/or relatively more biofouling. Moreover, hearing devices such as those described herein include sensor interfaces that may be beneficially positioned on a housing to leverage gravity to facilitate reducing accumulation of excessive or "old" biofluid, decreasing biofouling, and increasing the useful product lifespan of the hearing device and/or components thereof. Other benefits of the hearing devices and methods described herein will be made apparent herein.

As used herein, a "hearing device" may be implemented by any device or combination of devices configured to provide or enhance hearing to a user. For example, a hearing device may be implemented by a hearing aid configured to amplify audio content to a user or any other suitable hearing prosthesis or combination of hearing prostheses. In some examples, a hearing device may be implemented by a BTE housing configured to be worn behind an ear of a user. In some examples, a hearing device may be implemented by an ITE component configured to at least partially be inserted within an ear canal of a user. In some examples, a hearing device may include a combination of an ITE component, a BTE housing, and/or any other suitable component.

Figure 1:
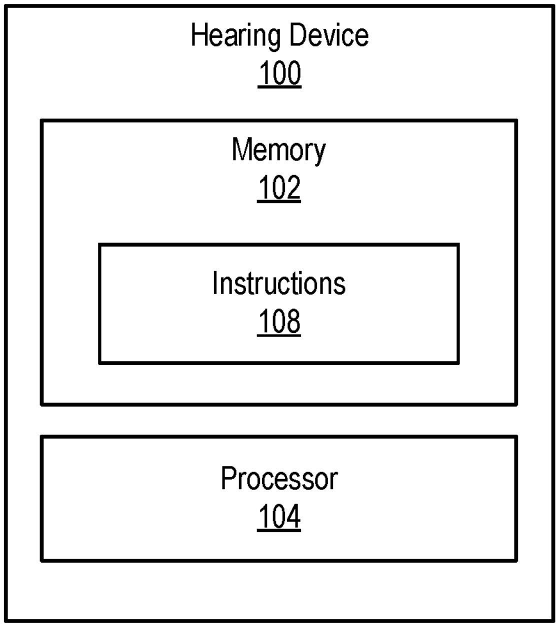
FIG. 1 illustrates an exemplary hearing device according to principles described herein.

FIG. 1 illustrates an exemplary hearing device 100 that may be implemented according to principles described herein. As shown, hearing device 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and processor 104 may be housed within or form part of a BTE housing. In some examples, memory 102 and processor 104 may be located separately from a BTE housing (e.g., in an ITE component). In some alternative examples, memory 102 and processor 104 may be distributed between multiple devices (e.g., multiple hearing devices in a binaural hearing system) and/or multiple locations as may serve a particular implementation.

Memory 102 may maintain (e.g., store) executable data used by processor 104 to perform any of the operations associated with hearing device 100. For example, memory 102 may store instructions 108 that may be executed by processor 104 to perform any of the operations associated with hearing device 100 assisting a user in hearing and/or any of the operations described herein. Instructions 108 may be implemented by any suitable application, software, code, and/or other executable data instance.

Memory 102 may also maintain any data received, generated, managed, used, and/or transmitted by processor 104. For example, memory 102 may maintain any suitable data associated with a hearing loss profile of a user, information associated with electroactive substances (e.g., medications, drugs, etc.) that may be detected in biofluid, information regarding medication treatment regimens, etc. Memory 102 may maintain additional or alternative data in other implementations.

Processor 104 is configured to perform any suitable processing operation that may be associated with hearing device 100. For example, when hearing device 100 is implemented by a hearing aid device, such processing operations may include monitoring ambient sound and/or representing sound to a user via an in-ear receiver. Processor 104 may be implemented by any suitable combination of hardware and software.

Figure 2:
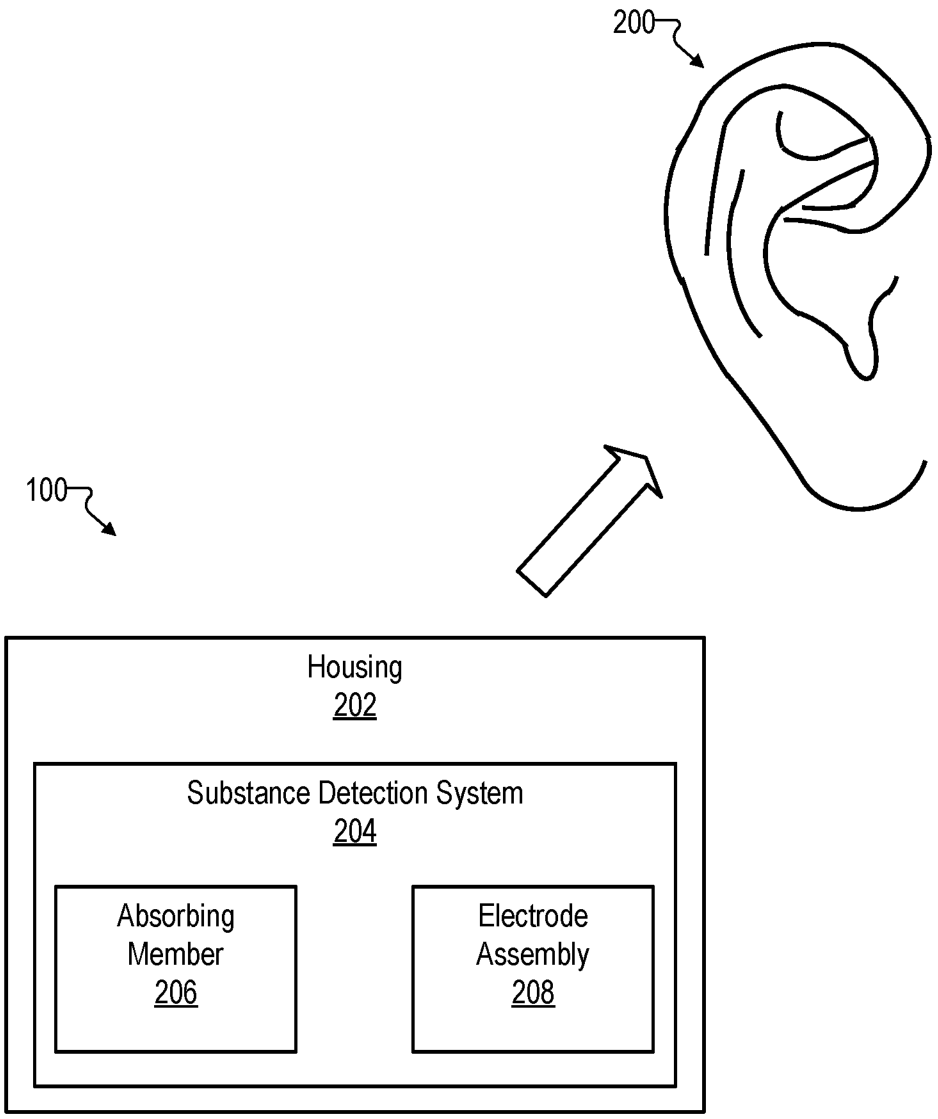
FIG. 2 illustrates an exemplary implementation of a hearing device according to principles described herein.

FIG. 2 shows an exemplary configuration that hearing device 100 may have in certain implementations. As shown in FIG. 2, hearing device 100 may include a housing 202, a substance detection system 204, an absorbing member 206, and an electrode assembly 208. Housing 202 may be configured to be worn at ear 200 of a user such that at least a portion of housing 202 is configured to engage with outer ear tissue. As used herein, "outer ear tissue" may correspond to any tissue of an ear of a user that is outside of the ear canal of the user. In certain examples, outer ear tissue may refer to tissue that includes eccrine glands that secrete biofluid in the form of sweat.

Housing 202 may be implemented in any suitable manner as may serve a particular implementation. For example, housing 202 may be custom formed for a particular user in certain examples. Alternatively, housing 202 may be configured to fit any one of a plurality of different users. In certain examples, housing 202 may be implemented as a BTE housing configured to be worn behind ear 200 of a user. Additionally or alternatively, housing 202 may be implemented as part of an ITE component that includes a housing that extends outside of the ear canal so as to engage with outer ear tissue of ear 200 while the ITE component is worn in the ear canal. Exemplary housings are described further herein.

As shown in FIG. 2, substance detection system 204 may include absorbing member 206 and electrode assembly 208 to facilitate interacting with and/or analyzing a biofluid. Absorbing member 206 may be positioned on housing 202 and may be configured to absorb biofluid secreted by outer ear tissue of a user while housing 202 is worn by the user. Absorbing member 206 may be configured in any suitable manner as may serve a particular implementation. For example, absorbing member 206 may be formed of any suitable porous material and/or may include one or more microfluidic channels configured to transport a biofluid so that the biofluid is in fluidic contact with electrode assembly 208. In certain examples, a size of the one or more microfluidic channels may be selected based on a desired amount of a capillary force used to draw the biofluid into absorbing member 206. Additionally or alternatively, biofluid transport through absorbing member 206 may be facilitated by osmosis, surface tension, pressure, hydrostatic flow, vacuum, and/or any other suitable mechanism.

In certain implementations, absorbing member 206 may be configured to contact a surface of ear 200 while housing 202 is worn by the user. For example, the surface of ear 200 that absorbing member 206 may be configured to contact may be positioned on a medial side of an auricle of ear 200 that faces a skull of the user. Additionally or alternatively, the surface of ear 200 that absorbing member 206 is configured to contact may be on a posterior side of a groove between an auricle of the ear and a skull of the user.

In certain examples, absorbing member 206 may include a selectively permeable membrane that may act as a biofluid filter to reduce biofouling of absorbing member 206 and/or electrode assembly 208.

In certain examples, absorbing member 206 may be removably attached to housing 202. In such examples, absorbing member 206 may be detached from housing 202 for cleaning and/or replacement. Alternatively, absorbing member 206 may be fixedly attached to housing 202. Exemplary configurations of absorbing member 206 are described further herein.

Electrode assembly 208 may be positioned with respect to absorbing member 206 such that electrode assembly 208 is in fluidic contact with the biofluid when the biofluid is absorbed by absorbing member 206. Electrode assembly 208 may have any suitable number and/or arrangement of electrodes and may be configured in any suitable manner as may serve a particular implementation. For example, electrode assembly 208 may include two or more electrodes arranged in any suitable manner to facilitate analyzing biofluid. In certain examples, electrode assembly 208 may be attached to or integrally formed with absorbing member 206. In certain alternative examples, electrode assembly 208 may be attached to housing 202 and may be configured to be associated with absorbing member 206 upon attachment of absorbing member 206 to housing 202.

Electrode assembly 208 may be configured to provide for a voltametric measurement (e.g., to measure a current response of an electroactive substance while the potential between two electrodes is varied (or vice versa)). As used herein, an "electroactive substance" may refer to any substance that may be found in biofluid and that may be detected using electrode assembly 208 in a voltametric measurement. For example, an electroactive substance may correspond to a medication taken by the user of hearing device 100, a drug molecule found in biofluid, and/or any other suitable electroactive substance.

In certain examples, at least one electrode included in electrode assembly 208 may operate as a working electrode to contact biofluid (e.g., to induce a redox reaction producing the measurable current) and to provide an electric potential difference between the electrodes in electrode assembly 208 over time. At least one other electrode in electrode assembly 208 may serve as a reference electrode with a known reduction potential as a gauge for the working electrode. The working electrode may also be employed in certain examples to balance the reactions occurring at the working electrode. However, both tasks may be difficult to achieve in practice by a single electrode. As such, a third electrode (e.g., a counter electrode or an auxiliary electrode) may be employed in certain examples to balance reactions occurring at the working electrode. The current may then be measured (or applied) between the working electrode and the counter electrode.

In certain examples, electrode assembly 208 may be configured to target a specific electroactive substance. To illustrate an example, the electroactive substance may correspond to the drug molecule acetaminophen ("APAP"). In such an example, a working electrode included in electrode assembly 208 may correspond to a Nafion-coated and hydrogen-terminated boron-doped diamond electrode ("Nafion/H-BADE"), which may be used to detect APAP.

In certain examples, electrode assembly 208 may include a plurality of different sets of electrodes where each set of electrodes included in the plurality of sets of electrodes is configured to detect a different electroactive substance in the biofluid. For example, electrode assembly 208 may include a first set of electrodes configured to facilitate a first reaction with a first electroactive substance in biofluid and a second set of electrodes configured to facilitate a second reaction with a second electroactive substance in the biofluid. The first electroactive substance may be different than the second electroactive substance. Each set may comprise at least one working electrode provided individually for each set, in particular to be solely used by the (single) set. Each set may further comprise at least one reference electrode, and optionally at least one counter electrode, which may be shared by at least two sets, in particular to be co-used by the sets, and/or provided individually for at least one set. Different exemplary configurations of electrode assembly 208 are described further herein.

Substance detection system 204 may be configured to perform any suitable operation using absorbing member 206 and electrode assembly 208 to facilitate analyzing a biofluid secreted by outer ear tissue. In certain examples, operations associated with substance detection system 204 may be performed by processor 104 of hearing device 100. For example, processor 104 may determine a property of biofluid (e.g., sweat) secreted by outer ear tissue of ear 200. The property of the biofluid may correspond to any suitable property as may serve a particular implementation. For example, the property of the biofluid may be indicative of a presence or an absence of an electroactive substance found in the biofluid, a concentration of the electroactive substance in the biofluid, and/or any other suitable property. In certain examples, the property of the biofluid may be indicative of the presence or the absence of a medication taken by the user and/or the concentration of the medication.

Substance detection system 204 (e.g., processor 104) may use absorbing member 206 and electrode assembly 208 in any suitable manner to facilitate determining a property of a biofluid. For example, substance detection system 204 may apply, by way of electrode assembly 208 of hearing device 100, an electric potential on the biofluid absorbed by absorbing member 206. Substance detection system 204 may apply the electric potential in any suitable manner. For example, substance detection system 204 may vary an amount of the electric potential that is applied during a predefined period of time.

In certain examples, substance detection system 204 may apply a different electric potential range to different sets of electrodes included in electrode assembly 208. For example, a first electric potential range may be applied to a first set of electrodes included in electrode assembly 208 and a second electric potential range that is different than the first electric potential range may be applied to a second set of electrodes included in electrode assembly 208.

Substance detection system 204 may measure (e.g., while an amount of the electric potential applied to the biofluid is varied) a current that flows through the biofluid based on the electric potential. In certain examples, substance detection system 204 may use the measured current to generate a voltammogram, which may correspond to a plot of the current as a function of the applied electric potential. The voltammogram may then be used in any suitable manner by substance detection system 204 to determine the property of the biofluid. For example, a shape of the voltammogram may be indicative of the presence or absence of a particular electroactive substance in the biofluid. Additionally or alternatively, the voltammogram may indicate a concentration of the particular electroactive substance. Accordingly, substance detection system 204 may analyze the voltammogram in any suitable manner to determine, for example, whether the particular electroactive substance is present.

In certain examples, a machine learning ("ML") algorithm (e.g., a Bayes classifier, a deep neural network ("DNN"), etc.) may be used to facilitate determining a property of a biofluid. Such a ML algorithm may be used to classify and attribute a voltammogram to a specific electroactive substance (e.g., drug composition) and/or concentration. In such examples, the ML algorithm may be trained based on voltammograms recorded from a sample group of users that are supervised while complying with a specific medication treatment regimen (e.g., in a clinical setting) such that training data may be labeled based on the known medication intake. In certain examples, such a ML algorithm may be further trained based on voltammograms obtained by substance detection system 204 from the user of hearing device 100. In certain examples, the ML algorithm may be performed by a processor 104 of hearing device 100. Alternatively, the ML algorithm may be performed by any suitable computing device that may be communicatively coupled to hearing device 100.

In certain examples, substance detection system 204 may detect or otherwise obtain additional biological information associated with the user to facilitate identifying or classifying a property of a biofluid. For example, substance detection system 204 may detect or otherwise obtain heart rate data, temperature data, resting heart rate data, heart rate variability data, blood pressure data, RR interval data, oxygen saturation data, movement pattern data of a user, etc. In certain examples, substance detection system 204 may use one or more additional sensors of hearing device 100 to detect the additional biological information. Additionally or alternatively, such additional biological data may be obtained from a device (e.g., a fitness watch) that is external to hearing device 100.

In certain examples, substance detection system 204, may determine, based on the property of the biofluid, a pharmacokinetic profile of the user. Such a pharmacokinetic profile may describe what the body of the user of hearing device 100 does to a medication and may be indicative of a movement of the medication into, through, and out of the body. In addition, a pharmacokinetic profile may provide information regarding at least one of a presence of the medication taken by the user or a concentration of the medication. Such information may be indicative of a time course of the medication's absorption, bioavailability, distribution, concentration, metabolism, and/or excretion.

In certain examples, substance detection system 204 may be configured to provide a notification regarding the property of the biofluid to at least one of a user of hearing device 100 or a third party associated with the user. Such a notification may be provided in any suitable manner. For example, the notification may be provided by way an audibly perceptible alert provided to the user by way of hearing device 100 (e.g., by way of a receiver in an ear canal of the user). Additionally or alternatively, such a notification may be provided by way of a text message, an email message, and/or in any other suitable manner. In examples where the notification is additionally or alternatively provided to a third party, the third party may correspond to a caretaker, a family member, a medical professional, an insurance provider, and/or any other suitable third party.

In certain examples, substance detection system 204 may be configured to collect and provide real-time notifications associated with the property of the biofluid to the user and/or a third party in any suitable manner.

In certain examples, substance detection system 204 may be configured to provide a notification regarding an operating status of absorbing member 206 and/or electrode assembly 208. Such a notification may be provided in any suitable manner, such as described herein, and may include any suitable information as may serve a particular implementation. For example, such a notification may indicate that absorbing member 206 and/or electrode assembly 208 are operating properly, that absorbing member 206 and/or electrode assembly are not working properly, that absorbing member 206 and/or electrode assembly 208 need to be cleaned (e.g., due to biofouling), that absorbing member 206 and/or electrode assembly 208 need to be replaced, etc.

To illustrate an example in which a notification may be provided, substance detection system 204 may be used in certain implementations to monitor user compliance with a medication treatment regimen. In such examples, substance detection system 204 may access information (e.g., from memory 102) regarding a medication treatment regimen to be followed by the user of hearing device 100. Such a medication treatment regimen may require the user to take a certain amount of a prescribed medicine during a predefined period of time. Based on the medication treatment regimen, substance detection system 204 may use absorbing member 206 and electrode assembly 208 to generate one or more voltammograms to determine the presence, absence, and/or concentration of prescribed medicine in the biofluid of the user during the predefined period of time. If the measured voltammograms indicate an absence of the prescribed medicine or that the concentration of the prescribed medication is below a predefined threshold level, substance detection system 204 may provide an audible notification to the user by way of hearing device 100 instructing the user to take the prescribed medication.

In certain examples, substance detection system 204 may additionally or alternatively maintain a time dependent data log that chronicles a user's compliance with a medication treatment regimen. Such a time dependent data log may be used to determine whether the medication treatment regimen has been followed, identify best practices for facilitating compliance with the medication treatment regimen, and/or for any other suitable purpose.

Figure 3B:
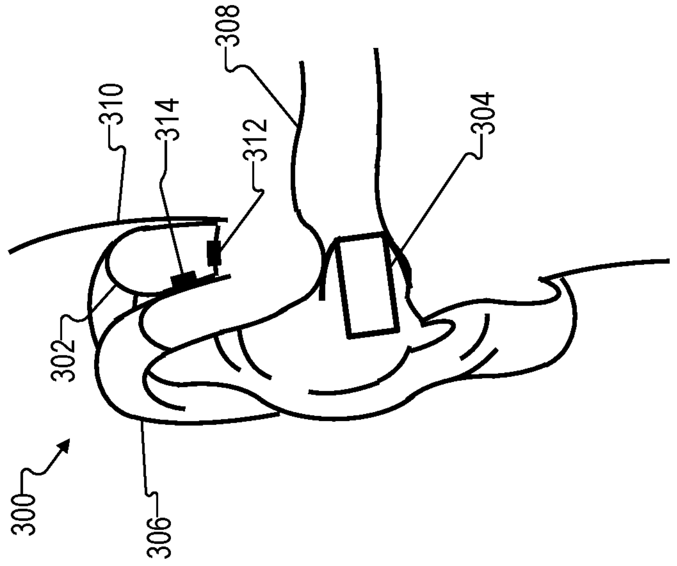
FIG. 3B illustrates an exemplary cross section of the hearing device shown in FIG. 3A that is taken along lines 3B-3B in FIG. 3A according to principles described herein.
Figure 3A:
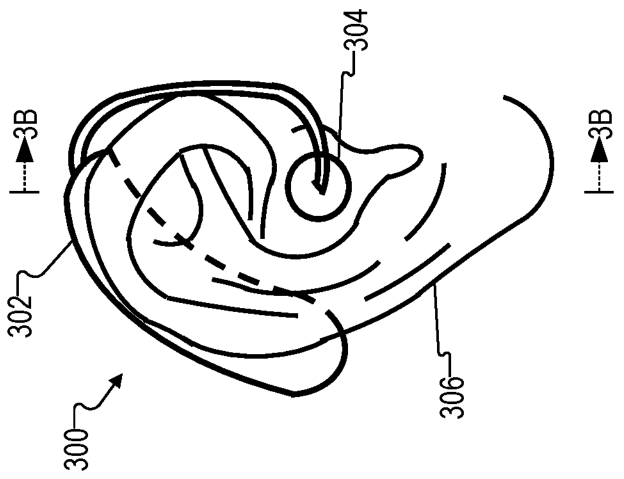
FIG. 3A illustrates an exemplary implementation of a hearing device that includes a behind-the-ear ("BTE") housing configured according to principles described herein.

FIGS. 3A-3B show an exemplary configuration that a hearing device 300 may have in certain implementations to facilitate absorbing biofluid from outer ear tissue. As shown in FIG. 3A, hearing device 300 may correspond to a receiver-in-the-canal ("RIC") hearing device that includes a BTE housing 302 and an ITE component 304 that are provided on an auricle 306 of the ear of a user. BTE housing 302 is configured to be worn behind auricle 306. ITE component 304 is configured to be at least partially inserted within an ear canal 308 of the user. In certain examples, ITE component may include a receiver (e.g., a speaker) configured to provide audible sound into ear canal 308. In certain alternative implementations, the receiver may be located in BTE housing 302 and audible sound may be conducted from BTE housing to ear canal 308 by way of a sound tube.

FIG. 3B is a cross-section taken along lines 3B-3B in FIG. 3A. As shown in FIG. 3B, BTE housing 302 is provided behind auricle 306 and between auricle 306 and the skull 310 of the user. In the example shown in FIG. 3B, BTE housing 302 includes a sensor interface 312 and a sensor interface 314. Each of sensor interface 312 and sensor interface 314 may include absorbing member 206 and electrode assembly 208 configured in any suitable manner such as described herein. Sensor interface 312 and sensor interface 314 are each provided on the housing at a position to engage with outer ear tissue of auricle 306. In the example shown in FIG. 3B, sensor interface 312 is positioned to engage with outer ear tissue that forms a connection between auricle 306 and skull 310. Sensor interface 314 is provided on housing 302 such that sensor interface 314 faces a medial side of auricle 306 that faces skull 310. In another example, sensor interface 314 may be provided on BTE housing 302 such that sensor interface 314 faces ear tissue adjacent to auricle 306 extending into skull 306, e.g., at a side of BTE housing 302 facing away from the medial side of auricle 306 toward skull 310. Although FIG. 3B illustrates an example where two different sensor interfaces are included, it is understood that any suitable number of sensor interfaces may be provided as may serve a particular implementation. For example, only one sensor interface (e.g., sensor interface 312) may be included in certain alternative examples.

Accumulation of excessive "old" biofluid may result in biofouling of sensor interfaces 312 and 314 and inhibit reliable monitoring of properties of the biofluid. To counteract this, sensor interfaces 312 and 314 may be beneficially positioned on housing 302 as shown in FIG. 3B such that they interact with (e.g., contact) outer ear tissue that is inclined relative to the surface of the earth in use (e.g., while the user is standing or sitting upright). For example, as shown in FIG. 3B, sensor interface 312 is positioned on housing 302 such that, during use of hearing device 300, sensor interface 312 is configured to interact with a downwardly inclined portion of outer ear tissue that forms the connection between auricle 306 and skull 310. Sensor interface 314 on the other hand is provided on housing 302 such that, during use of hearing device 300, sensor interface 314 is configured to interact with an inclined medial side surface of auricle 306 that faces skull 310.

With such a configuration, a gravitational force may act on biofluid secreted from glands in the outer ear tissue to facilitate controlling how much biofluid is absorbed by sensor interfaces 312 and 314. In addition, sensor interfaces 312 and 314 may be configured such that, for example, capillary forces that may be used to draw biofluid into sensor interfaces 312 and 314 work in a direction that pulls in the direction of the gravitational force along a first fluid path at which the biofluid is transported toward sensor interfaces 312, 314, and against the gravitational force along a second fluid path at which the biofluid is transported away from sensor interfaces 312, 314. That is, on the one hand, sensor interfaces 312 and 314 may be positioned on housing 302 and configured such that a net force including gravity, e.g., a gravitational pressure of a fluid accumulating at sensor interfaces 312, 314, which net force, in some instances, may further include a flow pressure of a fluid entering sensor interfaces 312, 314 and/or capillary forces at a boundary between sensor interfaces 312, 314 and a fluid channel leading to an outlet for the fluid, works to pull the biofluid away from electrode assemblies included in sensor interfaces 312 and 314, e.g., to provide for an efficient evacuation of an older biofluid accumulating around sensor interfaces 312, 314. In this way, in some instances, capillary forces acting in a direction opposite to gravity, e.g., at a boundary between the outlet and the outer skin environment, can be overcome. On the other hand, sensor interfaces 312, 314 may be positioned on housing 302 and configured such that a net force including gravity, e.g., a gravitational pressure of a fluid accumulating inside a fluid channel leading to sensor interfaces 312 and 314, which may, in some instances, further include a flow pressure inside the fluid channel and/or capillary forces at an inlet of the fluid channel, may pull the biofluid into sensor interfaces 312 and 314, for instance to provide for an efficient supply of a more recently produced biofluid toward sensor interfaces 312, 314. Sensor interfaces 312 and 314 may be positioned in any suitable manner on housing 302 to optimize a desired ratio between the force causing the biofluid to flow through sensor interfaces 312 and 314 and the counteracting gravitational force and thereby control the amount of biofluid transported through sensor interfaces 312 and 314. In so doing, it may be possible to either avoid or at least beneficially reduce "old" biofluid from pooling in sensor interfaces 312 and/or 314. In certain examples, it may be desirable to periodically replace sensor interface 312 and/or sensor interface 314 due to biofluid accumulation and/or other contaminations. However, with a configuration such as that shown in FIG. 3B, it may be possible to replace sensor interfaces 312 and 314 relatively less frequently because accumulation of "old" biofluid is reduced.

In certain examples, BTE housing 302 may be configured to rest or sit loosely behind auricle 306 while worn by the user such that sensor interfaces 312 and 314 are not in a tight fit with respect to the outer ear tissue. Such a loose fit may be beneficial in that it may result in less biofluid flow through sensor interfaces 312 and 314 than may otherwise occur with a relatively tighter fit. For example, such reduced biofluid flow may allow removal of "old" biofluid by the gravitational force, by movements of the user, and/or by evaporation of the biofluid into the surrounding environment.

Figure 4B:
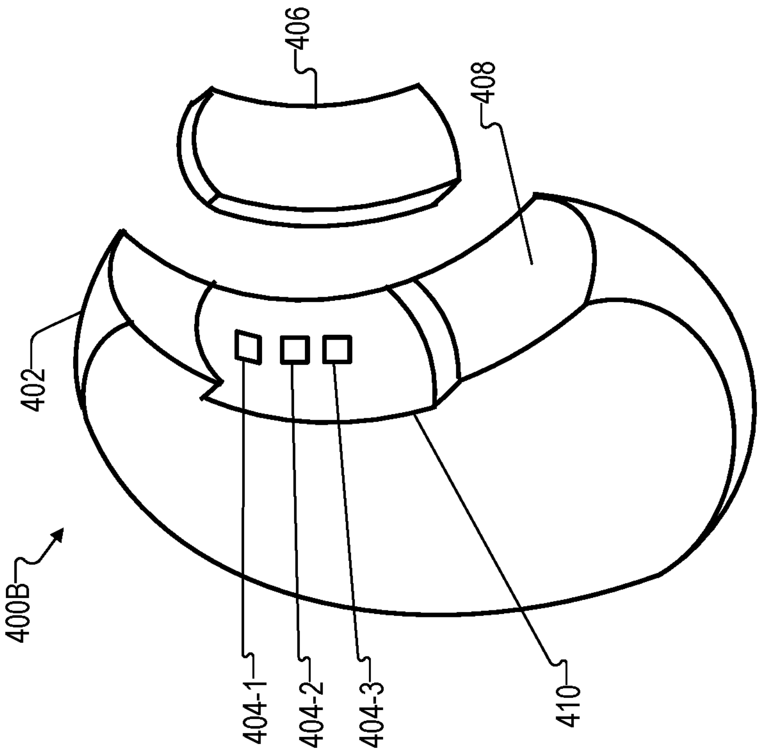
FIGS. 4A-5B illustrates exemplary implementations of a BTE housing of a hearing device according to principles described herein.
Figure 4A:
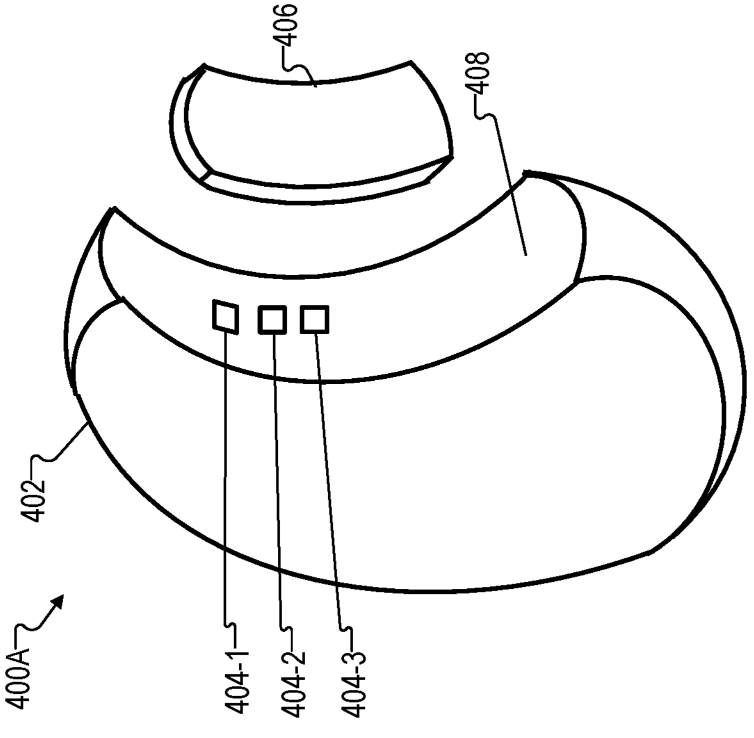

FIGS. 4A-5B illustrate different configurations that a sensor interface may have in certain examples. FIG. 4A illustrates a configuration 400A in which a BTE housing 402 includes a plurality of electrodes 404 (e.g., electrodes 404-1 through 404-3) and an absorbing member 406. Electrodes 404 may each be communicatively connected to circuitry (e.g., processor 104) within BTE housing 402 that may be configured to control and evaluate a voltametric measurement. Electrodes 404 are illustrated schematically for illustrative purposes in FIGS. 4A-4B. It is understood that electrodes 404 may have different sizes, shapes, and/or geometrical arrangements in other implementations.

In the example shown in FIG. 4A, electrodes 404-1, 404-2, and 404-3 are provided on a curved surface 408 on which BTE housing 402 is supported behind the ear while worn by a user. FIG. 4A is an exploded view of a possible configuration of a sensor interface. It is understood that absorbing member 406 would be positioned over electrodes 404-1, 404-2, and 404-3 and attached to BTE housing 402 during use. In certain examples, absorbing member 406 may be removably attachable to curved surface 408.

FIG. 4B illustrates an exemplary configuration 400B that is similar to that shown in FIG. 4A except that electrodes 404-1, 404-2, and 404-3 are provided within a recess 410 on curved surface 408 that is sized to receive absorbing member 406. FIG. 4B is an exploded view of a possible configuration of a sensor interface. It is understood that absorbing member 406 is configured to be positioned within recess 410 over electrodes 404-1, 404-2, and 404-3 and attached to BTE housing 402 during use. In such an example, absorbing member 406 may be substantially flush with curved surface 408 while inserted into recess 410.

Figure 5B:
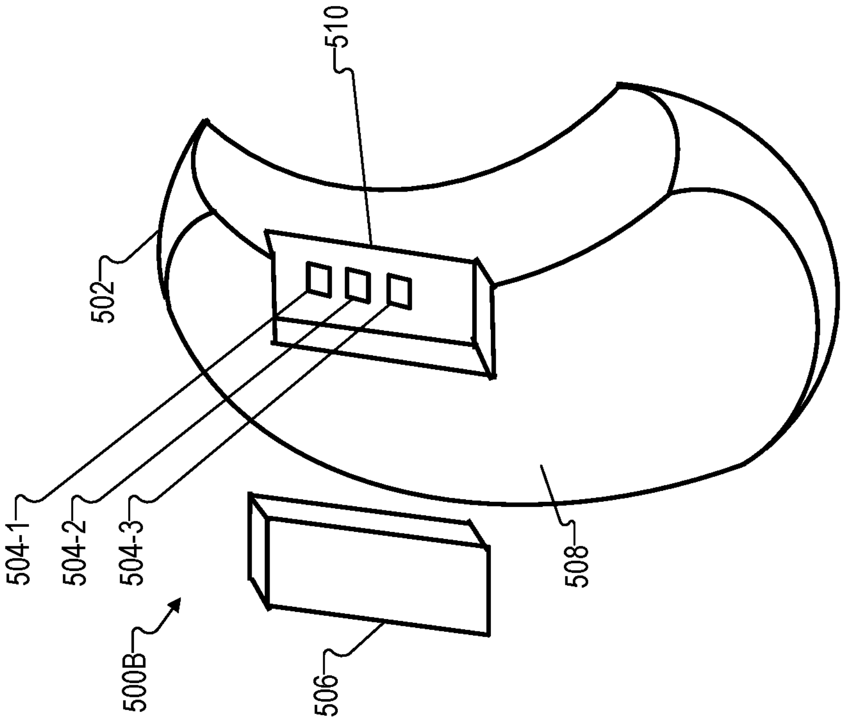
Figure 5A:
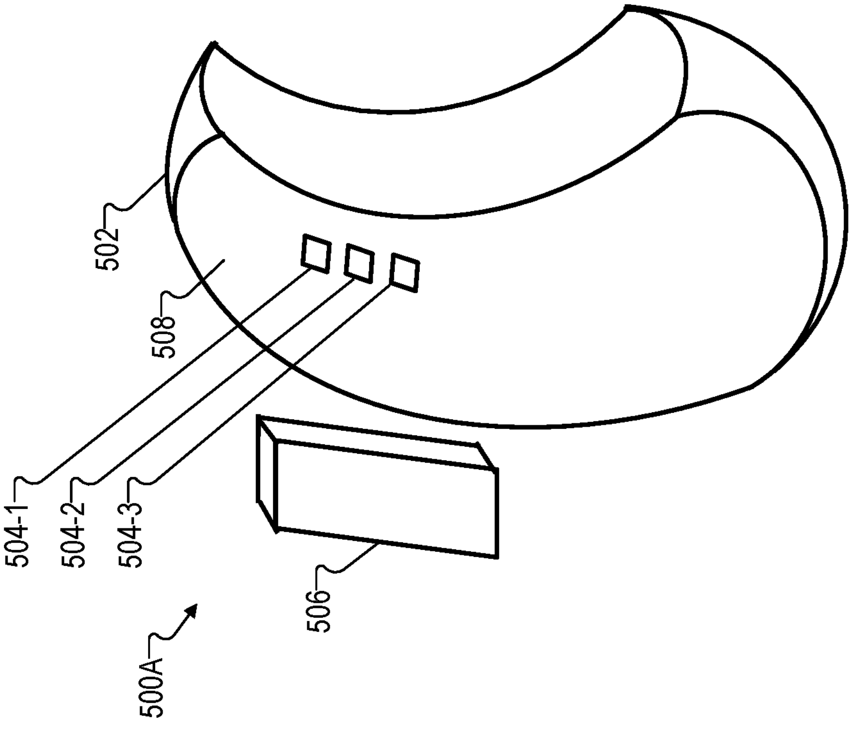

FIG. 5A illustrates an exemplary configuration 500A in which a BTE housing 502 includes a plurality of electrodes 504 (e.g., electrodes 504-1 through 504-3) and an absorbing member 506 configured to be provided on a side surface 508 of BTE housing 502. With the configuration shown in FIG. 5A, absorbing member 506 may be configured to face away from the skull of the user and toward a medial side of an auricle of the user. FIG. 5A is an exploded view of a possible configuration of a sensor interface. It is understood that absorbing member 506 would be positioned over electrodes 504-1, 504-2, and 504-3 and attached to BTE housing 502 during use.

FIG. 5B illustrates a configuration 500B that is similar to configuration 500A except that electrodes 504 are provided within a recess 510. FIG. 5B is an exploded view of a possible configuration of a sensor interface. It is understood that absorbing member 506 is configured to be positioned within recess 510 over electrodes 504-1, 504-2, and 504-3 and attached to BTE housing 502 during use. In the example shown in FIG. 5B, absorbing member 506 may be inserted within recess 510 such that absorbing member 506 is flush with side surface 508. Electrodes 504 are illustrated schematically for illustrative purposes in FIGS. 5A-5B. It is understood that electrodes 504 may have different sizes, shapes, and/or geometrical arrangements in other implementations.

Figure 6C:
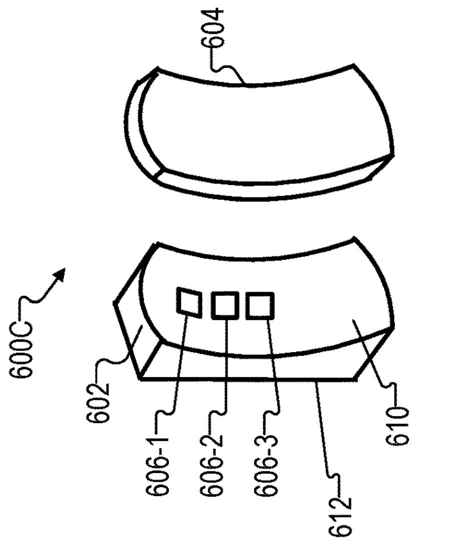
FIGS. 6A-6C illustrate exemplary electrode assembly and absorbing member configurations that may be implemented according to principles described herein.
Figure 6B:
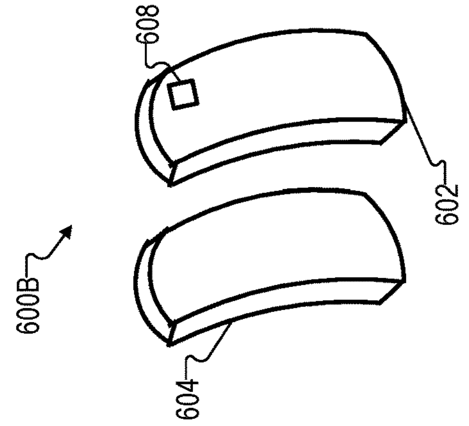
Figure 6A:
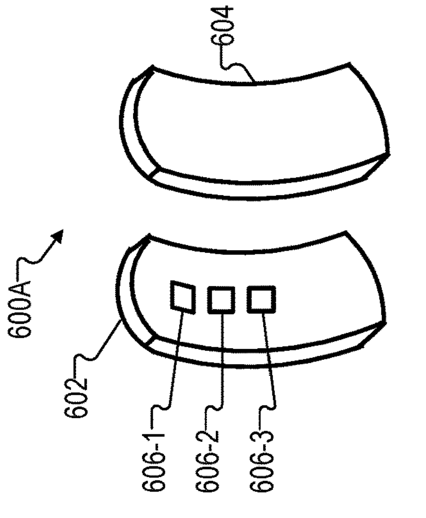

FIGS. 6A-6C illustrate different configurations of sensor interfaces that may be implemented in certain examples. FIG. 6A shows a configuration 600A having a support 602, an absorbing member 604, and a plurality of electrodes 606 (e.g., electrodes 606-1 through 606-3) provided on a surface of support 602. Absorbing member 604 may be removably attached to support 602 and the assembly of support 602 and absorbing member 604 may be removably attached to a housing (e.g., housing 202) of a hearing device.

FIG. 6B illustrates a configuration 600B in which support 602 may be implemented as a flexible printed circuit board on which one or more electrodes (not shown) may be printed. In the example shown in FIG. 6B, support 602 may include at least one electric contact 608 configured to engage with a corresponding electric contact on a housing (e.g., BTE housing 302) while the assembly of support 602 and absorbing member 604 is attached to the housing.

FIG. 6C illustrates an alternative configuration 600C in which support 602 includes a curved surface 610 with electrodes 606 provided thereon and a flat back surface 612 that is configured to contact a housing (e.g., BTE housing 302) while the assembly of support 602 and absorbing member 604 is attached to the housing.

In certain examples, sensor interfaces such as those shown in FIGS. 6A-6C may be each be specific to a particular medication treatment regimen. In such examples, a user may be able to easily exchange one sensor interface for another if there is a change in the medication treatment regimen to be followed by the user. In certain examples, sensor interfaces such as those described herein may be customized for a particular user based on the user's individual medication treatment regimen.

Figure 7A:
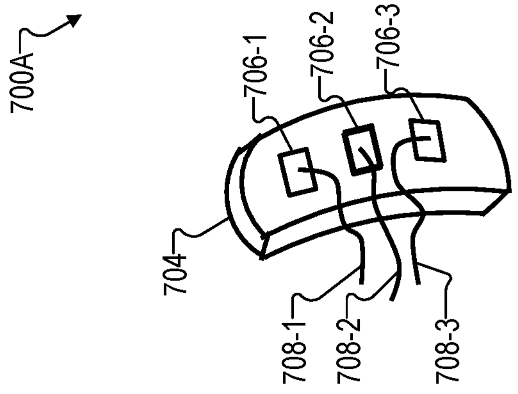
FIGS. 7A-7C illustrate additional exemplary configurations of a BTC housing of a hearing device according to principles described herein.
Figure 7B:
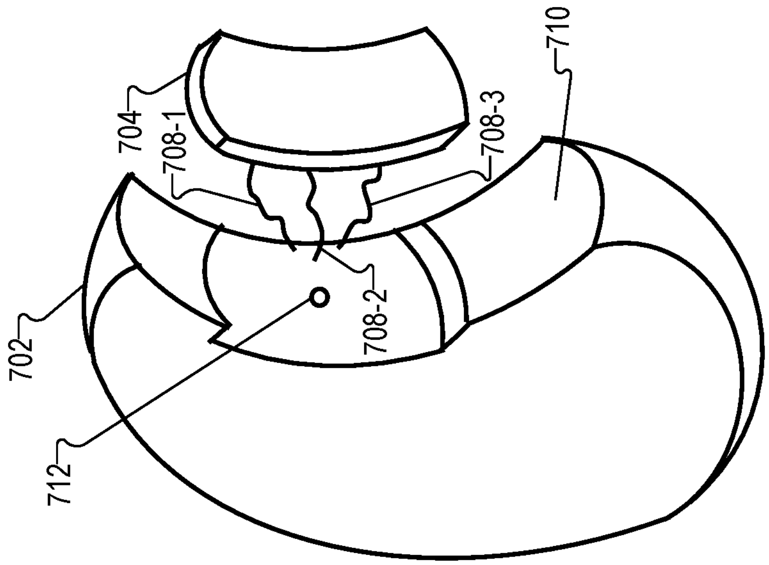
Figure 7C:
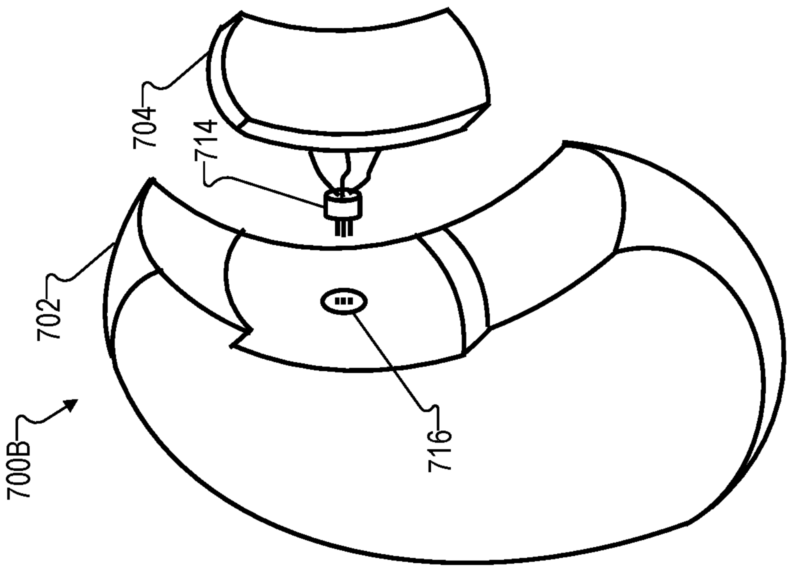

FIGS. 7A-7C illustrate different exemplary configurations for attaching electrode assemblies and absorbing members to a housing of a hearing device. FIGS. 7A-7B show an exemplary configuration 700A that includes a BTE housing 702, an absorbing member 704, and a plurality of electrodes 706 (e.g., electrodes 706-1 through 706-3). FIG. 7A shows electrodes 706 as being integrated with absorbing member 704. As shown in FIG. 7A, each of electrodes 706 is attached to a wire 708 (e.g., wires 708-1 through 708-3). As shown in FIG. 7B, wires 708 may be configured to pass through a hole 712 provided in a recess on a curved surface 710 of BTE housing 702. Wires 708 may connect in any suitable manner with circuitry located within BTE housing 702.

FIG. 7C illustrates an alternative configuration 700B in which a plugged connection may be used to connect electrodes 706 to circuitry within BTE housing 702. As shown in FIG. 7C, wires 708 may be attached to a plug 714 configured to be inserted within a plug receiver 716 in BTE housing 702.

Figure 8:
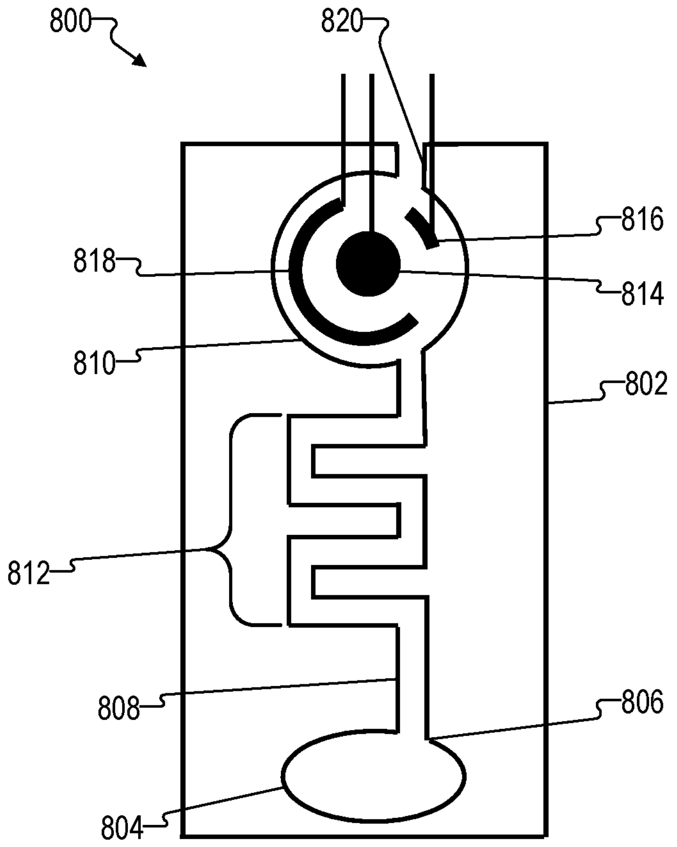
FIGS. 8-10 illustrate exemplary cross-sections of electrode assembly and absorbing member configurations that may be implemented according to principles described herein.
Figure 9:
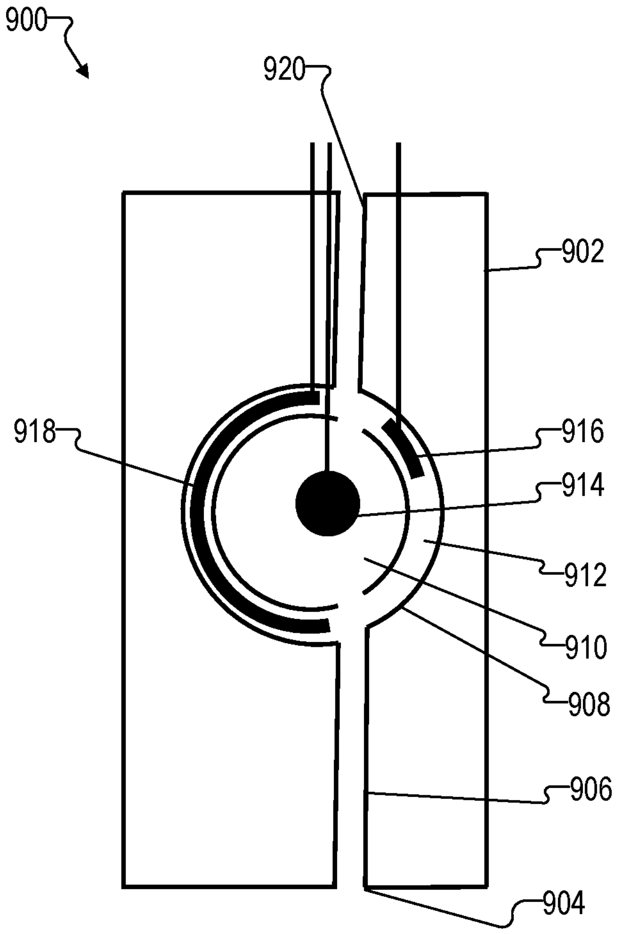
Figure 10:
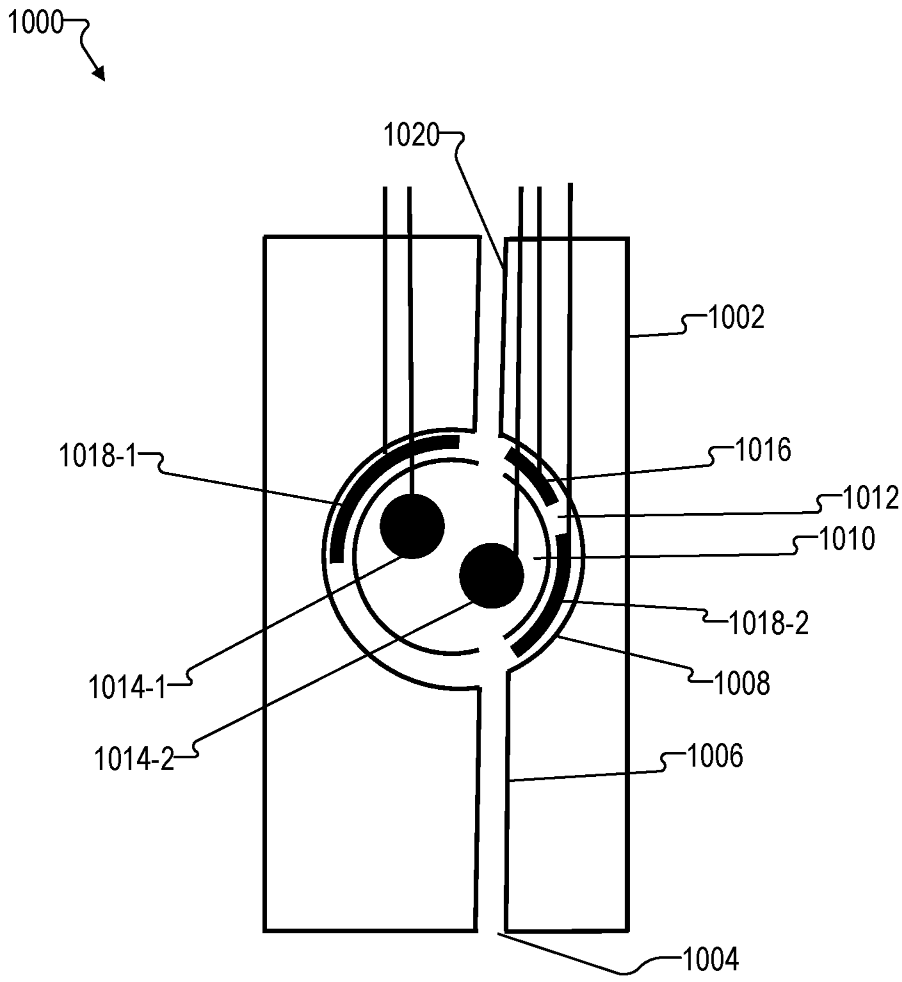

FIGS. 8-10 illustrate exemplary cross-sections of configurations of absorbing members and electrode assemblies that may be implemented in certain examples. In FIG. 8, configuration 800 includes an absorbing member 802 having a biofluid collecting chamber 804 with an inlet 806. In certain examples, biofluid collecting chamber 804 may be provided with a biofluid filter such as a selectively permeable membrane to reduce biofouling. Absorbing member 802 further includes a fluid channel 808 configured to transport biofluid (e.g., by way of capillary forces) to a measurement chamber 810. As shown in FIG. 8, fluid channel 808 may include a chicane portion 812 configured to provide flow resistance to biofluid traveling through fluid channel 808. A working electrode 814, a reference electrode 816, and a counter electrode 818 are provided within measurement chamber 810 so as to be in fluidic contact with biofluid entering into measurement chamber 810. Absorbing member 802 further includes an outlet 820 through which biofluid may exit after passing through measurement chamber 810. Configuration 800 may be arranged on the housing of the hearing device, e.g., at the position of sensor interface 312 or sensor interface 314, such that inlet 806 is positioned at a larger distance from the surface of the earth than outlet 820 when the hearing device is worn by the user, e.g., under normal daily circumstances during which the user stands or sits. The gravitational force may thus act on a fluid inside fluid channel 808 in a direction toward measurement chamber 810 (e.g., to assist the capillary forces to transport the biofluid to measurement chamber 810), and on a fluid inside measurement chamber 810 in a direction toward outlet 820 (e.g., to assist removal of the biofluid accumulating inside measurement chamber 810 through outlet 820).

FIG. 9 shows an alternative configuration 900 of an absorbing member and an electrode assembly. In the example shown in FIG. 9, biofluid is configured to enter an absorbing member 902 through an inlet 904, pass through a fluid channel 906, and enter into a measurement chamber 908. As shown in FIG. 9, measurement chamber 908 may comprise a plurality of interconnected sub-chambers 910 and 912. A working electrode 914, a reference electrode 916, and a counter electrode 918 are provided within measurement chamber 908 so as to be in fluidic contact with biofluid entering into measurement chamber 908. Electrodes 914, 916, and 918 are provided in different sub-chambers 910 and 912, which may facilitate the voltametric measurement. Absorbing member 902 further includes an outlet 920 through which biofluid may exit after passing through measurement chamber.

FIG. 10 shows an alternative configuration 1000 of an absorbing member and an electrode assembly. In the example shown in FIG. 10, biofluid is configured to enter an absorbing member 1002 through an inlet 1004, pass through a fluid channel 1006, and enter into a measurement chamber 1008. Similar to configuration 900, measurement chamber 1008 shown in FIG. 10 may comprise a plurality of interconnected sub-chambers 1010 and 1012. However, configuration 1000 is different from configuration 900 in that configuration 1000 includes a plurality of working electrodes 1014 (e.g., working electrodes 1014-1 and 1014-2), a reference electrode 1016, and a plurality of counter electrodes 1018 (e.g., counter electrodes 1018-1 and 1018-2). Such electrodes are provided within measurement chamber 1008 so as to be in fluidic contact with biofluid entering into measurement chamber 1008. Electrodes 1014-1, 1014-2, 1016, 1018-1, and 1018-2 are provided in different sub-chambers 1010 and 1012, which may facilitate a voltametric measurement. Absorbing member 1002 further includes an outlet 1020 through which biofluid may exit after passing through measurement chamber.

In the example shown in FIG. 10, working electrodes 1014 and counter electrodes 1018 may form an electrode array. Each of working electrodes 1014 and counter electrodes 1018 may be configured to provide for a redox reaction with a different electroactive substance (e.g., a different drug molecule) that may be in the biofluid to facilitate detection of multiple different electroactive substances. To that end, each of working electrodes 1014 may be formed of a different material. A first set of electrodes may be provided by one of the working electrodes 1014-1, 1014-2, the reference electrode 1016, and optionally one of the counter electrodes 1018-1, 1018-2, and a second set of electrodes may be provided by the other one of the working electrodes 1014-1, 1014-2, the reference electrode 1016, and optionally the other one of the counter electrodes 1018-1, 1018-2. The reference electrode 1016 may thus be shared by both sets.

Figure 11:
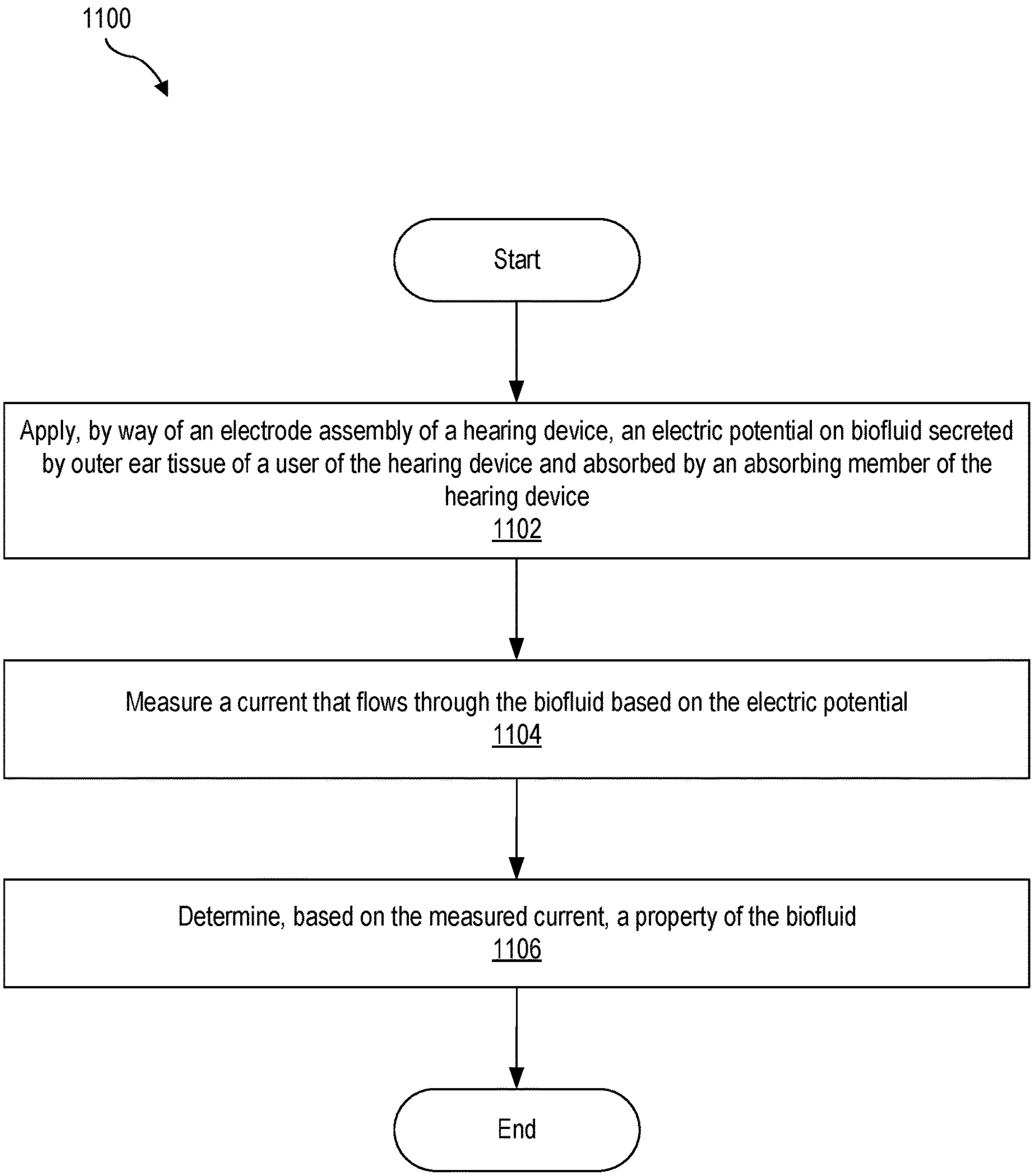
FIG. 11 illustrates an exemplary method according to principles described herein.

FIG. 11 illustrates an exemplary method 1100 for analyzing biofluid secreted by outer ear tissue according to principles described herein. While FIG. 11 illustrates exemplary operations according to one embodiment, other embodiments may omit, add to, reorder, and/or modify any of the operations shown in FIG. 11. One or more of the operations shown in FIG. 11 may be performed by a hearing device such as hearing device 100, any components included therein, and/or any implementation thereof.

At operation 1102, a substance detection system such as substance detection system 204 may apply, by way of an electrode assembly of a hearing device, an electric potential on biofluid secreted by outer ear tissue of a user of the hearing device and absorbed by an absorbing member of the hearing device. Operation 1102 may be performed in any of the ways described herein.

At operation 1104, the substance detection system may measure a current that flows through the biofluid based on the electric potential. Operation 1104 may be performed in any of the ways described herein.

At operation 1104, the substance detection system may determine, based on the measured current, a property of the biofluid. Operation 1106 may be performed in any of the ways described herein.

In the examples described herein, a substance detection system such as substance detection system 204 is described as being implemented by hearing device 100. However, it is understood that in certain examples, a substance detection system may be implemented by hearing device 100 in combination with one or more computing devices that are external to hearing device 100. For example, an external computing device (e.g., a tablet computer, a laptop computer, a smartphone, a desktop computer, etc.) may be communicatively coupled by way of any suitable communication technology to hearing device 100 and may be configured to perform one or more of the operations described herein. For example, such an external computing device may perform processing operations to determine or analyze a property of a biofluid. In such examples, the offloading of such processing operations to the external computing device may beneficially reduce power consumption of hearing device 100.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 12:
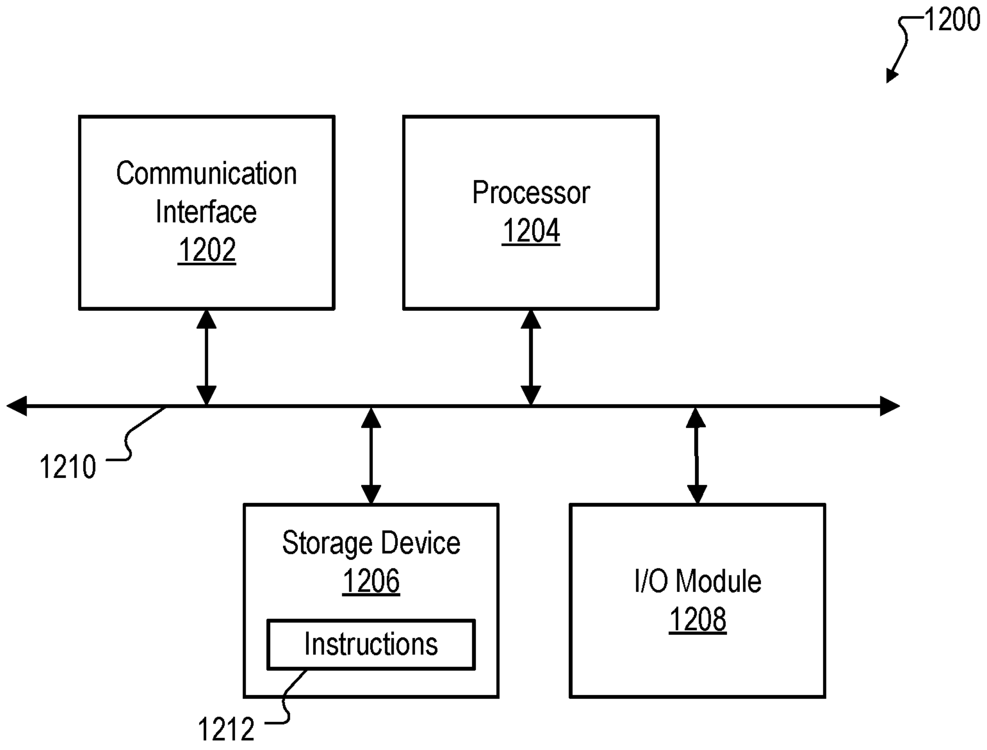
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected one to another via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data and/or interpreting, executing, and/or directing execution of one or more of the instructions, processes, and/or operations described herein. Processor 1204 may perform operations by executing computer-executable instructions 1212 (e.g., an application, software, code, and/or other executable data instance) stored in storage device 1206.

Storage device 1206 may include one or more data storage media, devices, or configurations and may employ any type, form, and combination of data storage media and/or device. For example, storage device 1206 may include, but is not limited to, any combination of the non-volatile media and/or volatile media described herein. Electronic data, including data described herein, may be temporarily and/or permanently stored in storage device 1206. For example, data representative of computer-executable instructions 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the systems, hearing devices, and/or other components described herein may be implemented by computing device 1200. For example, memory 102 may be implemented by storage device 1206, and processor 104 may be implemented by processor 1204.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device comprising:

a housing configured to be worn at an ear of a user;

an absorbing member positioned on the housing and configured to absorb a biofluid secreted by outer ear tissue of the user while the housing is worn by the user; and an electrode assembly positioned with respect to the absorbing member such that the electrode assembly is in fluidic contact with the biofluid when the biofluid is absorbed by the absorbing member, wherein:

the absorbing member includes a fluid channel oriented with respect to the housing such that, while the housing is worn by the user, gravity causes the biofluid to flow to the electrode assembly; and the absorbing member further includes an outlet that is downstream of the electrode assembly and that is configured to remain continually open while the hearing device is worn at the ear of the user to pass the biofluid from the outlet and out of the hearing device through use of gravitational force.

2. The hearing device of claim 1, wherein:

the housing is a behind-the-ear ("BTE") housing configured to be worn behind the ear of the user; and a surface of the ear of the user that the absorbing member is configured to contact is positioned on a medial side of an auricle of the ear that faces a skull of the user.

3. The hearing device of claim 1, wherein:

the housing is a behind-the-ear ("BTE") housing configured to be worn behind the ear of the user; and a surface of the ear that the absorbing member is configured to contact is on a posterior side of a groove between an auricle of the ear and a skull of the user.

4. The hearing device of claim 1, further comprising a processor configured to:

apply, by way of the electrode assembly of the hearing device, an electric potential on the biofluid absorbed by the absorbing member of the hearing device;

measure a current that flows through the biofluid based on the electric potential; and determine, based on the measured current, a property of the biofluid.

5. The hearing device of claim 4, wherein the property of the biofluid is indicative of a presence or an absence of an electroactive substance in the biofluid.

6. The hearing device of claim 4, wherein the processor is further configured to determine, based on the property of the biofluid, a pharmacokinetic profile of the user.

7. The hearing device of claim 6, wherein the pharmacokinetic profile provides information regarding least one of a presence of a medication taken by the user or a concentration of the medication.

8. The hearing device of claim 1, wherein the absorbing member is removably attached to the housing.

9. The hearing device of claim 1, wherein the electrode assembly is attached to the housing.

10. The hearing device of claim 1, wherein the electrode assembly is attached to the absorbing member.

11. The hearing device of claim 1, wherein the electrode assembly includes:

a first set of electrodes configured to facilitate a first reaction with a first electroactive substance in the biofluid; and a second set of electrodes different than the first set of electrodes and configured to facilitate a second reaction with a second electroactive substance in the biofluid, the second electroactive substance different than the first electroactive substance.

12. The hearing device of claim 1, wherein the electrode assembly further includes a counter electrode to balance reactions occurring at the reference electrode and the working electrode.

13. A hearing device comprising:

a memory storing instructions; and a processor communicatively coupled to the memory and configured to execute the instructions to:

apply, by way of an electrode assembly of the hearing device, an electric potential on biofluid secreted by outer ear tissue of a user of the hearing device and absorbed by an absorbing member of the hearing device;

measure a current that flows through the biofluid based on the electric potential; and determine, based on the measured current, a property of the biofluid, wherein:

the absorbing member includes a fluid channel oriented with respect to the hearing device such that, while the hearing device is worn by the user, gravity causes the biofluid to flow to the electrode assembly; and the absorbing member further includes an outlet that is downstream of the electrode assembly and that is configured to remain continually open while the hearing device is worn at the ear of the user to pass the biofluid from the outlet and out of the hearing device through use of gravitational force.

14. The hearing device of claim 13, wherein:

the applying of the electric potential on the biofluid includes varying an amount of the electric potential; and the measuring of the current includes measuring a current response of an electroactive substance in the biofluid while the amount of the electric potential applied on the biofluid is varied.

15. The hearing device of claim 13, wherein the processor is further configured to execute the instructions to provide a notification regarding the property of the biofluid to at least one of the user or a third party associated with the user.

16. The hearing device of claim 15, wherein the notification is an audibly perceptible message provided by way of the hearing device to the user.

17. A method comprising:

applying, by a substance detection system and by way of an electrode assembly of a hearing device, an electric potential on biofluid secreted by outer ear tissue of a user of the hearing device and absorbed by an absorbing member of the hearing device;

measuring, by the substance detection system, a current that flows through the biofluid based on the electric potential; and determining, by the substance detection system and based on the measured current, a property of the biofluid, wherein:

the absorbing member includes a fluid channel oriented with respect to the hearing device such that, while the hearing device is worn by the user, gravity causes the biofluid to flow to the electrode assembly; and the absorbing member further includes an outlet that is downstream of the electrode assembly and that is configured to remain continually open while the hearing device is worn at the ear of the user to pass the biofluid from the outlet and out of the hearing device through use of gravitational force.

18. The method of claim 17, wherein:

the applying of the electric potential on the biofluid includes varying an amount of the electric potential; and the measuring of the current includes measuring a current response of an electroactive substance in the biofluid while the amount of the electric potential applied on the biofluid is varied.

* * * * *